No. 755,589. Patented March 22, 1904.

UNITED STATES PATENT OFFICE.

MONTGOMERY WADDELL, OF NEW YORK, N. Y.

COMPOSITION FOR RAZOR-STROPS.

SPECIFICATION forming part of Letters Patent No. 755,589, dated March 22, 1904.

Original application filed March 4, 1903, Serial No. 146,096. Divided and this application filed September 5, 1903. Serial No. 172,039. (Specimens.)

*To all whom it may concern:*

Be it known that I, MONTGOMERY WADDELL, a subject of the King of Great Britain, residing in New York, county of New York, and State of New York, have invented a certain new and useful Improvement in Composition for Razor-Strops, of which the following is a specification.

This invention has relation to an improved composition for the treatment of razor-strops and other razor-sharpening devices, and this application is a division of my application filed March 4, 1903, Serial No. 146,096.

I have found that the quality of an ordinary leather or canvas strop can be greatly improved by applying to its surface metallic aluminium, preferably rubbed into the surface with a hard grease or oil with which the aluminium is incorporated.

In carrying out this improvement I mix finely-powdered metallic aluminium with a hard grease, such as cocoa-butter or analogous substance, which I form into a stick or cake which can be rubbed upon the sharpening-surface of the strop to be treated.

I have found that strops treated as above described produce a very fine edge without difficulty.

What I claim is—

1. A cake or stick for rubbing on the surface of razor-strops consisting of a material of a greasy nature which is hard at ordinary temperatures, the same having finely-divided aluminium incorporated with it, substantially as described.

2. A cake or stick for rubbing on the surface of razor-strops consisting of cocoa-butter having finely-divided aluminium incorporated with it, substantially as described.

MONTGOMERY WADDELL.

Witnesses:
    ALBERT A. HOSEY,
    HAROLD S. MACKAYE.